United States Patent
Kaneta

(10) Patent No.: US 10,387,492 B2
(45) Date of Patent: Aug. 20, 2019

(54) INFORMATION PROCESSING SYSTEM, INFORMATION PROCESSING METHOD, AND PROGRAM

(71) Applicant: Rakuten, Inc., Tokyo (JP)

(72) Inventor: Yusaku Kaneta, Tokyo (JP)

(73) Assignee: Rakuten, Inc., Tokyo (JP)

( * ) Notice: Subject to any disclaimer, the term of this patent is extended or adjusted under 35 U.S.C. 154(b) by 227 days.

(21) Appl. No.: 15/309,799

(22) PCT Filed: May 12, 2014

(86) PCT No.: PCT/JP2014/062636
§ 371 (c)(1),
(2) Date: Nov. 9, 2016

(87) PCT Pub. No.: WO2015/173870
PCT Pub. Date: Nov. 19, 2015

(65) Prior Publication Data
US 2017/0169129 A1    Jun. 15, 2017

(51) Int. Cl.
*G06F 16/14* (2019.01)
*G06F 16/84* (2019.01)
(Continued)

(52) U.S. Cl.
CPC .......... *G06F 16/86* (2019.01); *G06F 16/152* (2019.01); *G06F 16/182* (2019.01);
(Continued)

(58) Field of Classification Search
CPC ......... G06F 17/30917; G06F 17/30109; G06F 17/30194; G06F 17/3023; G06F 17/30536;
(Continued)

(56) References Cited

U.S. PATENT DOCUMENTS 9,720,976 B2 * 8/2017 Kataoka ............ G06F 17/30619
2001/0044795 A1 * 11/2001 Cohen ............... G06F 17/30699
(Continued)

OTHER PUBLICATIONS

G. Ottaviano, R. Grossi, "Semi-indexing Semi-structuredData in Tiny Space", Proceedings of the 20th ACM InternationalConference on Information and Knowledge Management (CIKM 2011),pp. 1485-1494, 2011.
(Continued)

*Primary Examiner* — Jay A Morrison
(74) *Attorney, Agent, or Firm* — HEA Law PLLC

(57) ABSTRACT

An information processing system divides the bit string indicating a search target parentheses string into a plurality of blocks, calculates a local excess value of an end bit in each block, calculates a local minimum excess value of each block, specifies a block including a bit with a given excess value, based on the local excess values of the end bits and the local minimum excess values, and specifies the position of a bit with the given excess value in the specified block. In specification of a bit position, the position of the bit with the given excess value corresponding to the predetermined number is determined, based on the number of bits with the value 1 among leading bits which are included in a bit string included in the specified block and of which number is a predetermined number and the given excess value.

5 Claims, 12 Drawing Sheets

(51) Int. Cl.
  *G06F 16/182* (2019.01)
  *G06F 16/27* (2019.01)
  *G06F 16/2458* (2019.01)
  *G06F 16/18* (2019.01)

(52) U.S. Cl.
  CPC ...... *G06F 16/1873* (2019.01); *G06F 16/2462* (2019.01); *G06F 16/2468* (2019.01); *G06F 16/2474* (2019.01); *G06F 16/278* (2019.01)

(58) Field of Classification Search
  CPC ......... G06F 17/30542; G06F 17/30548; G06F 17/30584; G06F 16/86; G06F 16/2468; G06F 16/182; G06F 16/1873; G06F 16/278; G06F 16/2474; G06F 16/2462; G06F 16/152
  See application file for complete search history.

(56) References Cited

U.S. PATENT DOCUMENTS

| | | | |
|---|---|---|---|
| 2003/0037034 A1* | 2/2003 | Daniels | G06Q 10/087 |
| 2005/0055357 A1* | 3/2005 | Campbell | G06F 8/61 |
| 2010/0131475 A1* | 5/2010 | Kataoka | G06F 17/30911 707/693 |
| 2011/0161357 A1* | 6/2011 | Kataoka | H03M 7/40 707/769 |

OTHER PUBLICATIONS

G. Ottaviano, R. Grossi, "Fast Compressed Tries throughPath Decompositions", Proceedings of the 14th Meeting on AlgorithmEngineering Experiments (ALENEX 2012), pp. 65-74, 2012.

* cited by examiner

FIG.4

```
{----------------------------------- ⓪
 "DATE":"Mar 1, 2014"
  {--------------------------------- ①
   "TITLE":"Introduction"
    {------------------------------- ②
     "Section":"I am …"
    }
    {------------------------------- ③
     "Section":"By the way…"
    }
  }
  {--------------------------------- ④
   "TITLE":"First Impression"
    {------------------------------- ⑤
     "Section":"Two …"
      {----------------------------- ⑥
       "Link":"http:…"
      }
    }
    {------------------------------- ⑦
     "Section":"A …"
    }
          ⋮
  }
}
```

| NODE NUMBER | 0 | 1 | 2 | | 3 | | | | 4 | 5 | 6 | | | 7 | | |
|---|---|---|---|---|---|---|---|---|---|---|---|---|---|---|---|---|
| BIT POSITION | 1 | 2 | 3 | 4 | 5 | 6 | 7 | 8 | 9 | 10 | 11 | 12 | 13 | 14 | 15 | 16 |
| BLOCK NUMBER | 0 | | | | | | | | 1 | | | | | | | |
| BP REPRESENTATION | ( | ( | ( | ) | ( | ) | ) | ( | ( | ( | ) | ) | ( | ) | ) | ) |
| BIT STRING | 1 | 1 | 1 | 0 | 1 | 0 | 0 | 1 | 1 | 1 | 0 | 0 | 1 | 0 | 0 | 0 |
| GLOBAL EXCESS | 1 | 2 | 3 | 2 | 3 | 2 | 1 | 2 | 3 | 4 | 3 | 2 | 3 | 2 | 1 | 0 |

FIG.7

| BIT POSITION | CHARACTER POSITION |
|---|---|
| 1 | 1 |
| 2 | 26 |
| 3 | 55 |
| 5 | 85 |
| | |

FIG.9

| PARENTHESES TREE DATA IB | 1 | 1 | 1 | 0 | 1 | 0 | 0 | 1 | 1 | 1 | 0 | 0 | 1 | 0 | 0 |
|---|---|---|---|---|---|---|---|---|---|---|---|---|---|---|---|

| LOCAL MINIMUM EXCESS LM2 | 0 | 0 | 0 | -1 | 0 | -2 | 0 | -2 |
|---|---|---|---|---|---|---|---|---|

| LOCAL EXCESS AT BOUNDARY (LOW-ORDER) | 2 | 0 | 2 | 0 |
|---|---|---|---|---|
| LOCAL MINIMUM EXCESS (LOW-ORDER) | 0 | 0 | 0 | 0 |
| LOCAL MINIMUM EXCESS (HIGH-ORDER) | 2 | -1 | 0 | -2 |

| LOCAL MINIMUM EXCESS LM4 | 0 | -1 | 0 | -2 |
|---|---|---|---|---|

| LOCAL EXCESS AT BOUNDARY (LOW-ORDER) | 2 | 0 | 0 | -2 |
|---|---|---|---|---|
| LOCAL MINIMUM EXCESS (LOW-ORDER) | 0 | | 0 | |
| LOCAL MINIMUM EXCESS (HIGH-ORDER) | 1 | | -2 | |

| LOCAL MINIMUM EXCESS LM8 | 0 | -2 |
|---|---|---|

INFORMATION PROCESSING SYSTEM, INFORMATION PROCESSING METHOD, AND PROGRAM

CROSS REFERENCE TO RELATED APPLICATIONS

This application is a National Stage of International Application No. PCT/JP2014/062636 filed on May 12, 2014. The contents of the above document is incorporated herein by reference in its entirety.

TECHNICAL FIELD

The present invention relates to an information processing system, an information processing method, and a program.

BACKGROUND ART

Data in a semi-structured text format, such as XML (Extensible Markup Language), JSON (JavaScript Object Notation), or the like, has been used. There is available a method in which parentheses tree data comprising a BP (balanced parentheses) bit string is used as an index of data in the semi-structured text format. According to this method, an appropriate position of data is searched for by obtaining the position of a bit with an excess value for a search in a bit string. Non-Patent Literature 1 discloses a method in which semi-structured text data is used as a BP bit string.

In a search using this method, a block is searched for, using a minimum excess value or the like of each of a plurality of blocks obtained by dividing a bit string, and the position of a bit with an excess value for the search in a block is thereafter obtained. An algorithm in which the position of a bit satisfying a search condition in a block is checked sequentially beginning with the top bit takes time for processing. Non-Patent Literature 2 describes that a bit position is specified at a high speed by searching a look-up table generated in advance, using as a search key a combination of a bit string of a block and an excess value.

CITATION LIST

Patent Literature

Non-Patent Literature 1: G. Ottaviano, R. Grossi, "Semi-indexing Semi-structured Data in Tiny Space", Proceedings of the 20th ACM International Conference on Information and Knowledge Management (CIKM 2011), pp. 1485-1494, 2011.

Non-Patent Literature 2: G. Ottaviano, R. Grossi, "Fast Compressed Tries through Path Decompositions", Proceedings of the 14th Meeting on Algorithm Engineering Experiments (ALENEX 2012), pp. 65-74, 2012.

SUMMARY OF INVENTION

Technical Problem

Processing of specifying a bit position, using a look-up table results in using a large amount of memory for the look-up table. This likely cause a problem that, for example, a cache memory of a processor cannot be effectively utilized.

The present invention has been conceived in view of the above, and aims to provide an information processing system, an information processing method, and a program capable of reducing the amount of memory used in a search for a bit position satisfying a search condition in a bit string of parentheses tree data including a plurality of blocks.

Solution to Problem

In order to achieve the above described object, an information processing system according to the present invention includes dividing means for dividing a bit string indicating a search target parentheses string into a plurality of blocks; local excess-at-boundary calculation means for calculating a local excess value of the end bit in each block; local minimum excess calculation means for calculating a local minimum excess value that is the minimum local excess value among the local excess values of the respective bits in each block; block specification means for specifying a block including a bit with a given excess value, based on the local excess values of the end bits in the respective blocks and the local minimum excess values of the respective blocks; and bit position specification means for specifying the position of the bit with the given excess value in the specified block, wherein the bit position specification means determines, based on a number of bits with the value of 1 among leading bits which are included in the bit string included in the block specified and of which number is a predetermined number, the predetermined number, and the given excess, whether or not the position of the bit with the given excess value is a position corresponding to the predetermined number.

An information processing method according to the present invention includes a dividing step of dividing a bit string indicating a search target parentheses string into a plurality of blocks; a local excess-at-boundary calculation step of calculating a local excess value of the end bit in each block; a local minimum excess calculation step of calculating a local minimum excess value that is the minimum local excess value among the local excess values of the respective bits in each block; a block specification step of specifying a block including a bit with a given excess value, based on the local excess values of the end bits in the respective blocks and the local minimum excess values of the respective blocks; and a bit position specification step of specifying the position of the bit with the given excess value in the specified block, wherein at the bit position specification step, based on the number of bits with the value of 1 among leading bits which are included in the bit string included in the specified block and of which number is a predetermined number, the predetermined number, and the given excess value, whether or not the position of the bit with the given excess value is a position corresponding to the predetermined number is determined.

A program according to the present invention causes a computer to function as dividing means for dividing a bit string indicating a search target parentheses string into a plurality of blocks; local excess-at-boundary calculation means for calculating a local excess value of the end bit in each block; local minimum excess calculation means for calculating a local minimum excess value that is the minimum local excess value among the local excess values of the respective bits in each block; block specification means for specifying a block including a bit with a given excess value, based on the local excess values of the end bits in the respective blocks and the local minimum excess values of the respective blocks; and bit position specification means for specifying the position of the bit with the given excess value in the specified block, wherein the bit position specification means determines, based on the number of bits with the value of 1 among leading bits which are included in the bit string included in the specified block and of which number is a predetermined number, the predetermined number, and the given excess value, whether or not the position of the bit with the given excess value is a position corresponding to the predetermined number.

Another information processing system according to the present invention includes dividing means for dividing a bit string indicating a search target parentheses string into a plurality of blocks; local excess-at-boundary calculation means for calculating a local excess value of the end bit in each block; local minimum excess calculation means for calculating a local minimum excess value that is the minimum local excess value among the local excess values of the respective bits in each block; block specification means for specifying a block including a bit with a given excess value, based on the local excess values of the end bits in the respective blocks and the local minimum excess values of the respective blocks; and bit position specification means for specifying the position of the bit with the given excess value in the specified block, wherein the bit position specification means obtains leading bits which are included in the bit string included in the specified block and of which number is a predetermined number, calculates a local excess value at the end of the obtained leading bits, and determines whether or not the position of the bit with the given excess value is a position corresponding to the predetermined number, based on the calculated local excess value and the given excess value.

Another information processing method according to the present invention includes a dividing step of dividing a bit string indicating a search target parentheses string into a plurality of blocks; a local excess-at-boundary calculation step of calculating a local excess value of the end bit in each block; a local minimum excess calculation step of calculating a local minimum excess value that is the minimum local excess value among the local excess values of the respective bits in each block; a block specification step of specifying a block including a bit with a given excess value, based on the local excess values of the end bits in the respective blocks and the local minimum excess values of the respective blocks; and a bit position specification step of specifying the position of the bit with the given excess value in the specified block, wherein at the bit position specification step, leading bits which are included in the bit string included in the specified block and of which number is a predetermined number is obtained, a local excess value at the end of the obtained leading bits is calculated, and whether or not the position of the bit with the given excess value is a position corresponding to the predetermined number is determined, based on the calculated local excess value and the given excess value.

Another program according to the present invention causes a computer to function as dividing means for dividing a bit string indicating a search target parentheses string into a plurality of blocks; local excess-at-boundary calculation means for calculating a local excess value of the end bit in each block; local minimum excess calculation means for calculating a local minimum excess value that is the minimum local excess value among the local excess values of the respective bits in each block; block specification means for specifying a block including a bit with a given excess value, based on the local excess values of the end bits in the respective blocks and the local minimum excesses of the respective blocks; and bit position specification means for specifying the position of the bit with the given excess value in the specified block, wherein the bit position specification means obtains leading bits which are included in the bit string included in the specified block and of which number is a predetermined number, calculates a local excess value at the end of the obtained leading bits, and determines whether or not the position of the bit with the given excess value is a position corresponding to the predetermined number, based on the calculated local excess value and the given excess value.

According to the present invention, it is possible to reduce the amount of memory used in a search for a bit position satisfying a search condition in a bit string of parentheses tree data including a plurality of blocks.

In one embodiment of the present invention, the bit position specification means may determine whether or not $2 \times n - m = l$ is held, n being the number of bits with the value of 1, m being the predetermined number, and l being the given excess value, to thereby determine whether or not the position of the bit with the given excess value is the position corresponding to the predetermined number.

In one embodiment of the present invention, the bit position specification means may execute in parallel the determination using a first number as the predetermined number and the determination using a second number different from the first number as the predetermined number.

In one embodiment of the present invention, the bit position specification means may include means for generating a tentative bit string in which the values of leading bits which are included in the bit string included in the specified block and of which number is a predetermined number are left as original and the value of a remaining bit is changed to a predetermined value; means for obtaining a bit string indicating the number of bits with the value of 1 included in the tentative bit string; means for shifting to left the obtained bit string indicating the number of bits; means for obtaining a bit string indicating the excess value of the leading bits by subtracting the bit string indicating the predetermined number from the bit string shifted to left; and means for determining, based on the bit string indicating the excess value of the leading bits and the given excess value, whether or not the position of the bit with the given excess value in the specified block is the position corresponding to the predetermined number.

In one embodiment of the present invention, the local minimum excess calculation means may include means for calculating a local minimum excess value and a local excess value at the end with respect to a first sub-block included in each block, and for calculating a local minimum excess value with respect to a second block adjacent to the end of the first sub-block, and means for obtaining smaller one of the value indicating the local minimum excess value calculated with respect to the first sub-block and the value obtained by adding the value indicating the local minimum excess value calculated with respect to the second sub-block to the local excess value at the end calculated with respect to the first sub-block, as a local minimum excess value of a connected bit string obtained by connecting the bit strings included in the first sub-block and the second sub-block, respectively.

BRIEF DESCRIPTION OF DRAWINGS

FIG. 4 is a diagram illustrating one example of semi-structured text data;

FIG. 7 is a diagram illustrating one example of generated bit position relation data;

FIG. 9 is a diagram for explaining one example of a process of calculation of a local minimum excess by an index generation unit;

DESCRIPTION OF EMBODIMENTS

Figure 1:
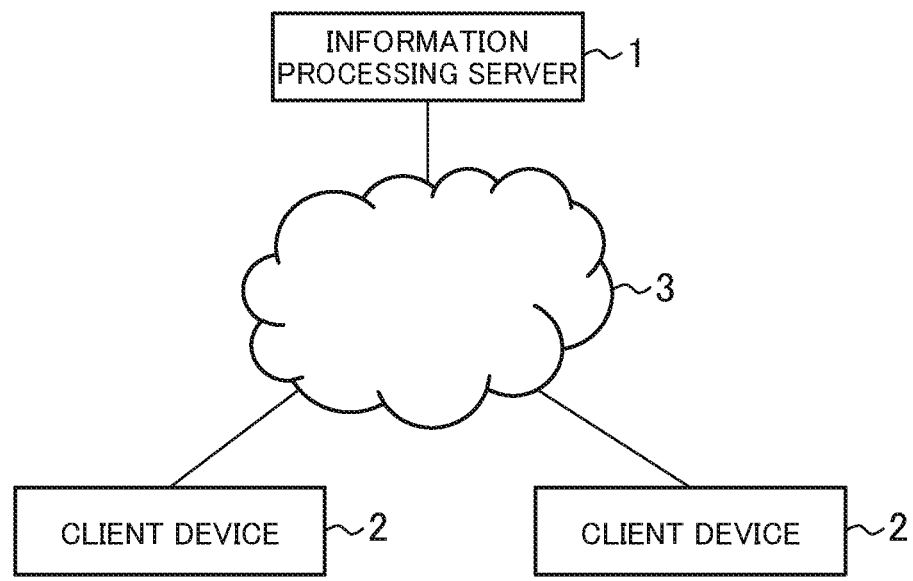
FIG. 1 is a diagram illustrating one example of an information processing system according to an embodiment of the present invention.

In the following, an embodiment of the present invention will be described, based on the drawings. Structural components having the same function are given the same reference characters, and a duplicate description is not made. In the following, a system for distributing data in the semi-structured text format, such as XML or the like, and an index thereof so that the data is processed on a receiver side is mainly described.

FIG. 1 is a diagram illustrating one example of an information processing system according to an embodiment of the present invention. An information processing system according to this embodiment of the present invention includes an information processing server 1 and a client device 2. The information processing server 1 is a server computer, and the client device 2 is, for example, a personal computer or a mobile terminal device (a tablet, an electronic book terminal, or the like).

Figure 2:
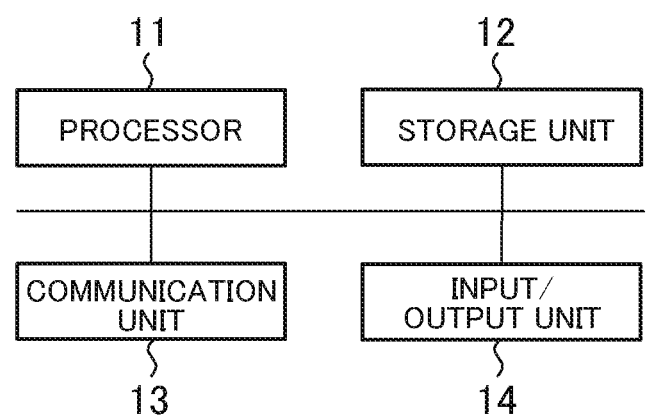
FIG. 2 is a diagram illustrating one example of a hardware structure of an information processing server and a client device.

FIG. 2 is a diagram illustrating one example of a hardware structure of the information processing server 1 and the client device 2. Each of the information processing server 1 and the client device 2 includes a processor 11, a storage unit 12, a communication unit 13, an input/output unit 14, and a bus 15.

The processor 11 operates according to a program stored in the storage unit 12. The processor 11 controls the communication unit 13 and the input/output unit 14. The above mentioned program may be provided via the Internet or the like or as being stored in a computer readable storage medium such as a flash memory, a DVD-ROM, or the like.

The storage unit 12 is made using a memory device, such as a RAM, a flash memory, or the like, or a hard disk drive. The storage unit 12 stores the above mentioned program. In addition, the storage unit 12 stores information and an operation result input from the respective units.

The communication unit 13 provides a function for communicating with other devices, and is constituted by, for example, an integrated circuit and a connecter terminal of a wired LAN, an integrated circuit and an antenna of a radio LAN, or the like. Under control by the processor 11, the communication unit inputs information received from other devices into the processor 11 and/or the storage unit 12, and sends information to other device.

The input/output unit 14 includes a video controller for controlling a display output means, a controller for obtaining data from an input device, or the like. An input device includes a keyboard, a mouse, a touch panel, or the like. Under control by the processor 11, the input/output unit 14 outputs display data to a display output device, and obtains data input from a user by operating an input device. The display output device is, for example, a display device externally connected or a display panel incorporated in the client device 2.

The bus 15 connects the processor 11, the storage unit 12, the communication unit 13, and the input/output unit 14 to transmit a signal including data between these devices. An operation unit for executing processing described below may be connected to the bus 15.

Figure 3:
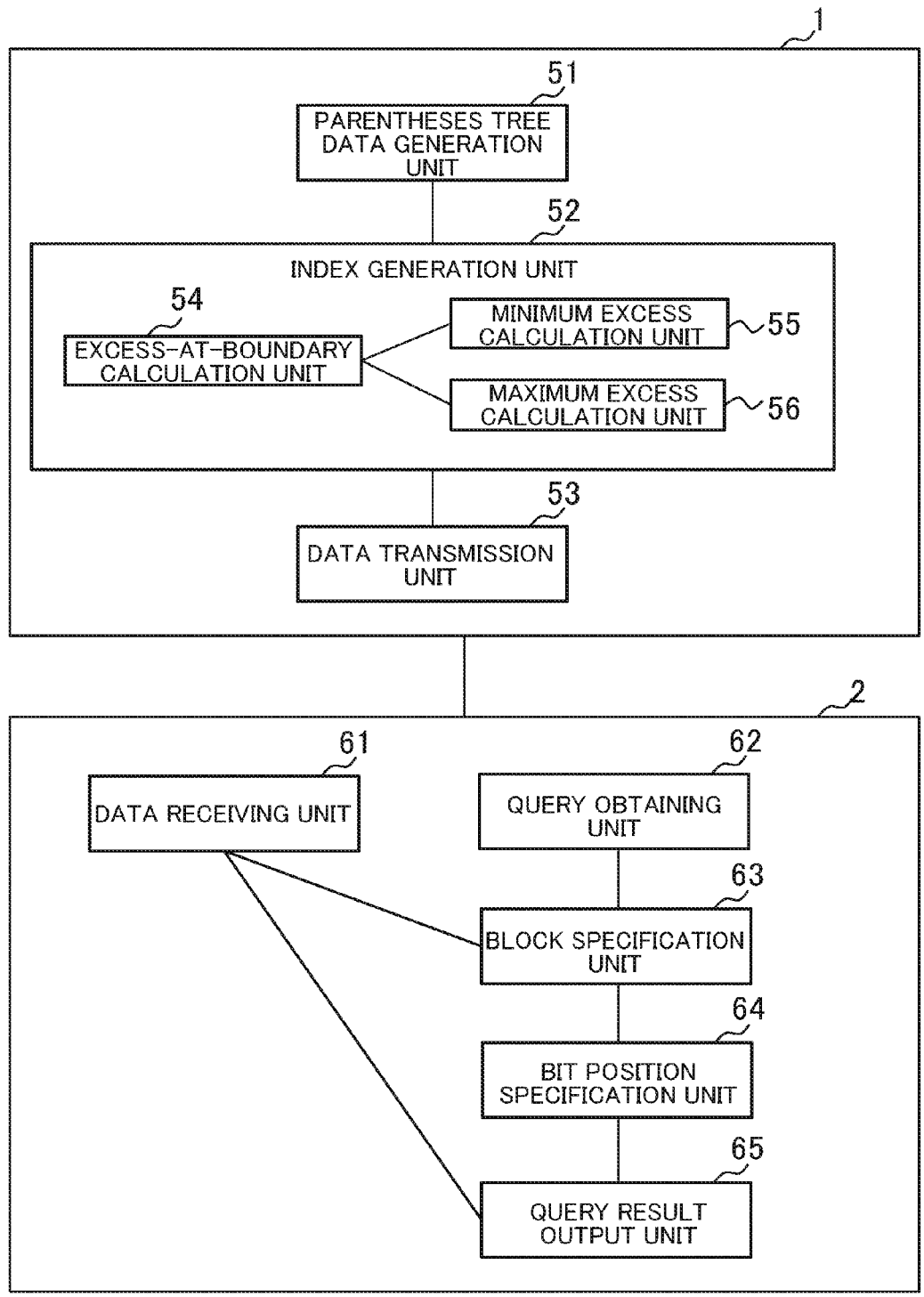
FIG. 3 is a block diagram illustrating functions implemented in an information processing system.

FIG. 3 is a block diagram illustrating functions implemented in the information processing system. The information processing system functionally includes a parentheses tree data generation unit 51, an index generation unit 52, a data transmission unit 53, a data receiving unit 61, a query obtaining unit 62, a block specification unit 63, a bit position specification unit 64, and a query result output unit 65. The index generation unit 52 functionally includes an excess-at-boundary calculation unit 54, a minimum excess calculation unit 55, and a maximum excess calculation unit 56. In this embodiment, the parentheses tree data generation unit 51, the index generation unit 52, and the data transmission unit 53 are provided by the processor 11 included in the information processing server 1 executing a program stored in the storage unit 12 and controlling the communication unit 13 and the input/output unit 14. The data receiving unit 61, the query obtaining unit 62, the block specification unit 63, the bit position specification unit 64, and the query result output unit 65 are provided by the processor 11 included in the client device 2 executing a program stored in the storage unit 12 and controlling the communication unit 13 and the input/output unit 14. Alternatively, the query obtaining unit 62, the block specification unit 63, the bit position specification unit 64, and the query result output unit 65 may be provided by the processor 11 or the like included in the information processing server 1. At least one of the information processing server 1 and the client device 2 may have an operation unit, which is a dedicated hardware, and the operation unit and the processor 11 may cooperatively provide some or all of the above mentioned functions.

Figure 14:
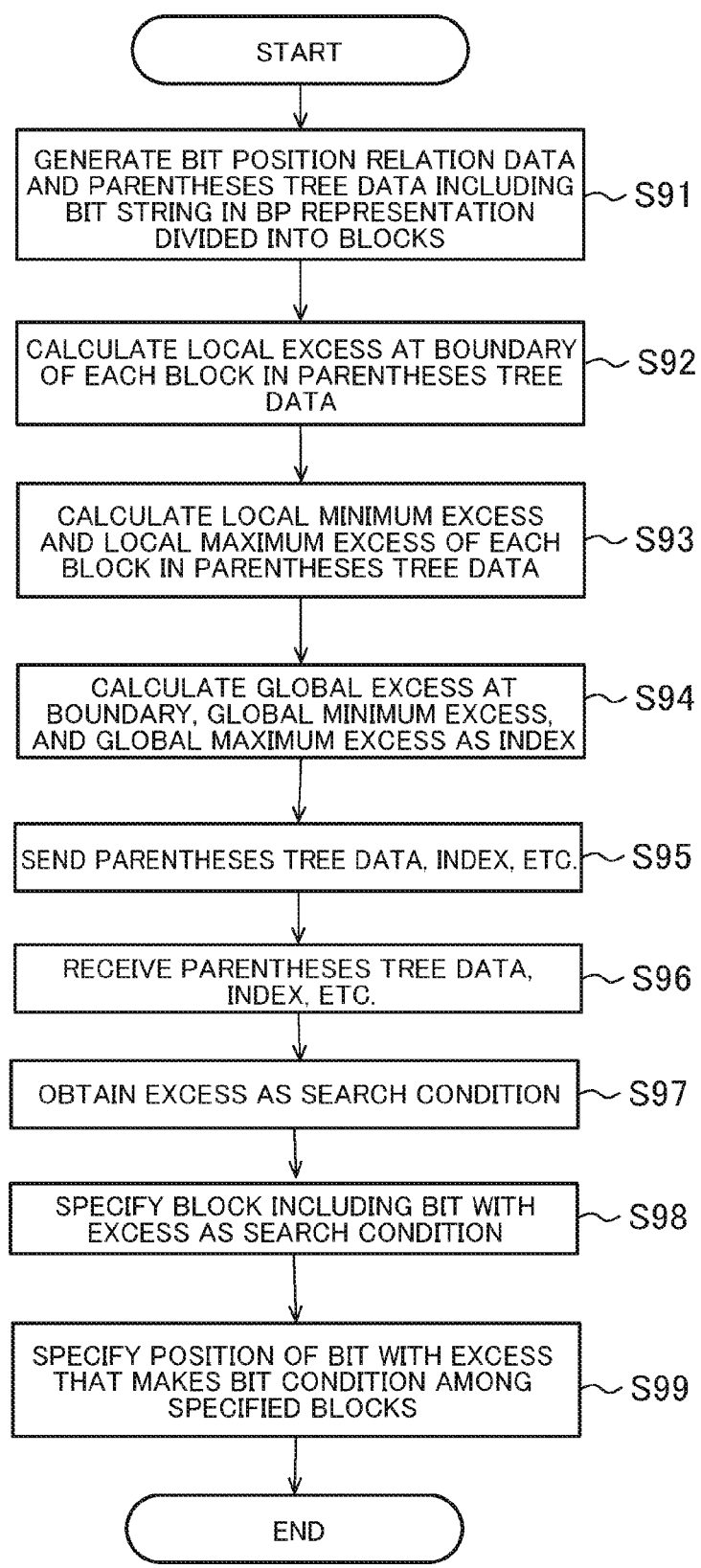
FIG. 14 is a flowchart schematically illustrating processing by an information processing system.

FIG. 14 is a flowchart schematically illustrating processing by the information processing system. A part of the processing shown in FIG. 14 may be executed in parallel. For example, steps S92 and S93 may be actually executed in parallel. Further, for example, the processing at step S97 and thereafter is actually repetitively executed for every time a search condition is given.

The parentheses tree data generation unit 51 is mainly provided by the processor 11 and the storage unit 12. Based on the text data in the semi-structured text format, the parentheses tree data generation unit 51 generates parentheses tree data including a bit string in BP representation, and bit position relation data indicating a relation between a bit position in the parentheses tree data and a position in the text data (step S91). In the above, the parentheses tree data generation unit 51 stores data in which the generated bit string is divided into a plurality of blocks in the storage unit 12 as the parentheses tree data.

FIG. 4 is a diagram illustrating one example of semi-structured text data. The semi-structured text data shown in FIG. 4 is JSON data, being data including a plurality of articles, like a blog. This data indicates two articles contributed at a certain date. It is known that semi-structured text data generally corresponds to a tree structure including a plurality of nodes. In the semi-structured text data, each of the plurality of nodes is expressed by a character string from the start to end points of the node in the semi-structured text data. For example, the start and end points may be represented by a symbol ("{" and "}", respectively, in the example in FIG. 4) or indicated according to any other constructional rule. Further, the semi-structured text data may have a nested structure in which a character string of a node incorporates a character string of a child node of that node. Still further, a character string of a child node may incorporate a character string of a subordinate node thereof, such as a grand-child node. A circled number and a broken line in FIG. 4 are a reference character and a line for explaining the semi-structured text data. Specifically, the circled number indicates the number of a node corresponding to the position of the parenthesis to which the circled number is connected via the broken line.

Figures 5, 6:
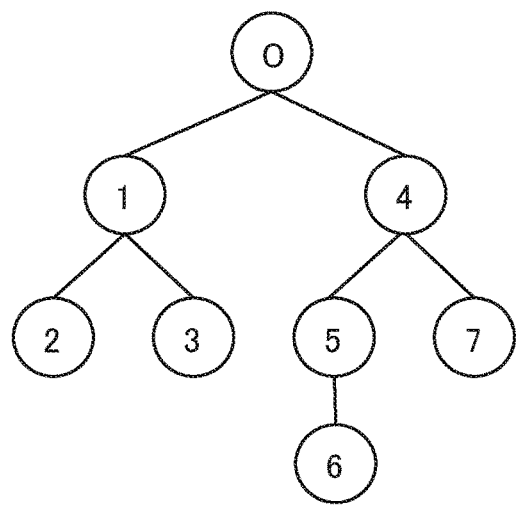
FIG. 5 is a diagram illustrating one example of a tree structure indicated by semi-structured text data.
FIG. 6 is a diagram illustrating one example of a generated bit string data in BP representation.

FIG. 5 is a diagram illustrating one example of a tree structure indicated by the semi-structured text data. FIG. 5 shows a tree structure corresponding to the semi-structured text data shown in FIG. 4. The node numbered 0 is the highest-order node, and child nodes thereof are nodes numbered 1 and 4. Child nodes of the node numbered 1 are nodes numbered 2 and 3. Child nodes of the node numbered 4 are nodes numbered 5 and 7, and a child node of the node numbered 5 is a node numbered 6.

FIG. 6 is a diagram illustrating one example of a relation among a bit string in BP representation a node and a block. The bit string in BP representation is divided into a plurality of blocks and is generated by the parentheses tree data generation unit 51. The bit string shown in FIG. 6 is data generated by the parentheses tree data generation unit 51, in which denotations of a node number, a bit position, parentheses tree representation, and an excess in FIG. 6 are for explanation of the bit string.

The bit string shown in FIG. 6 is generated from the semi-structured text data shown in FIG. 4. "("and")" in the row of parentheses tree representation (in the following, a simple denotation as "parenthesis" refers to a parenthesis for the parentheses tree representation) indicates a start point and an end point, respectively, of each node in the semi-structured text data shown in FIG. 4. Thus, "1" and "0" in a bit string indicate the start point and the endpoint, respectively, of a corresponding node. In FIG. 6, a bit position is identified by a number beginning with 1. In this embodiment, one block includes 8 bits, and the block number begins with zero. Although the number of bits included in one block may not be 8, a power of two is preferable. In the following, the number of bits in a block is referred to as a block length. In a case where the term "block" is used in connection with other data, a block length thereof is equivalent to a block in the bit string.

In the BP representation in FIG. 6, an opening parenthesis and a closing parenthesis corresponding to the opening parenthesis indicate a node. The node number in FIG. 6 indicates the number of a node which starts at the bit position with the node number, in which the node number corresponds to the node number in the tree structure in FIG. 5. An excess is a value obtained by subtracting the number of bits "0" from the number of bits "1" that are present between the head and the concerned bit position, being a number indicating the depth of a node of the tree structure.

Note here that although the bit position number becomes larger from left to right in the bit string shown in FIG. 6, as to data of a physical block stored in a memory of the storage unit 12 or a register of the processor 11, a bit with a larger position number is stored at a position of a higher-order digit of the memory or the register. Specifically, as to the bit string shown in FIG. 6, a bit on a further right side is stored at a position of a higher-order digit of a memory or register.

FIG. 7 is a diagram illustrating one example of a bit position generated relation data. Bit position relation data is data for associating a bit position in a bit string of the parentheses tree data with a character string of a node corresponding to the bit position. The bit position relation data shown in FIG. 7 includes a bit position and a start position of a node in the semi-structured text data, and associates a bit position with a node character string. Alternatively, the bit position relation data may include a bit position and a node character string itself.

With the parentheses tree data and the bit position relation data, it is possible to specify and obtain data on each node from the semi-structured text data. For example, in a search for a closing parenthesis corresponding to an opening parenthesis at a start point of any node (for example, a current node), for example, when a search condition based on the excess at the start point of the node is given, a bit with an excess that satisfies the search condition can be obtained from the bit string. More specifically, in a case where, in FIG. 6, the bit position 9, which is the position of the start point of the node numbered 5 that is a current node, and an excess 3 are known, the end point of the node can be retrieved, based on a bit position that satisfies the condition below. That is, the condition is being a bit position greater than 9 and minimum among the bit positions at which an excess of the bit is 2, which is smaller by one than that at the start point. In the example shown in FIG. 6, the bit position 12, or a bit position that satisfies this condition, is retrieved as the end point. Further, in a case where the bit in the next bit position is 1, which indicates "(", the next bit position is a start position of a node in the same order, and, in a case where the bit is 0, which indicates ")", the next bit position is an end position of a node in a higher order. As described above, it is known that it is possible to trace the relation between nodes of a tree structure by searching for the bit position of a bit with a designated excess and closest to a certain bit position.

Note here that a specific algorithm for processing by the parentheses tree data generation unit 51 for generating the bit string in BP representation and dividing the bit string into blocks and for generating the bit position relation data are not described here as being known, and described in Non-Patent Literature 1, or the like.

In the following, processing for obtaining an index for a high speed search for a bit position satisfying a search condition will be described.

The index generation unit 52 is mainly provided by the processor 11 and the storage unit 12. The index generation unit 52 generates data of an index for use in a high speed search for a bit position that satisfies an excess condition. This index is, for example, a global excess at a boundary, a global minimum excess, or a global maximum excess for every block. The excess-at-boundary calculation unit 54, included in the index generation unit 52, calculates a local excess at the boundary of each of the plurality of blocks (step S92), and then calculates a global excess at the boundary from the local excess at the boundary to store in the storage unit 12 (step S94). The minimum excess calculation unit 55, included in the index generation unit 52, calculates a local minimum excess of each of the plurality of blocks (step S93), and then calculates a global minimum excess from the local minimum excess to store in the storage unit 12 (step S94). The maximum excess calculation unit 56, included in the index generation unit 52, calculates a local maximum excess of each of the plurality of blocks (step S93), and then calculates a global maximum excess from the local maximum excess to store in the storage unit 12 (step S94).

Note here that the term "local" in the term "local excess at the boundary" or the like refers to a relative excess, in principle, when an excess at the start position of each block (immediate before the start bit of the block) is used as a reference (0). That is, the local excess at the boundary refers to a local excess of the end bit of the block; the local minimum excess refers to the minimum one of the local excesses of the plurality of bits in the block; the local maximum excess refers to the maximum one of the local excesses of the plurality of bits in the block. Meanwhile, an excess when using the start position of the entire bit string of the parentheses tree data as a reference is referred to as a global excess. That is, the global excess at the boundary refers to an excess at the end bit of the block; the global minimum excess refers to the minimum one of the excesses of the plurality of bits in the block; the global maximum excess refers to the maximum one of the excesses of the plurality of bits in the block.

Figure 8:
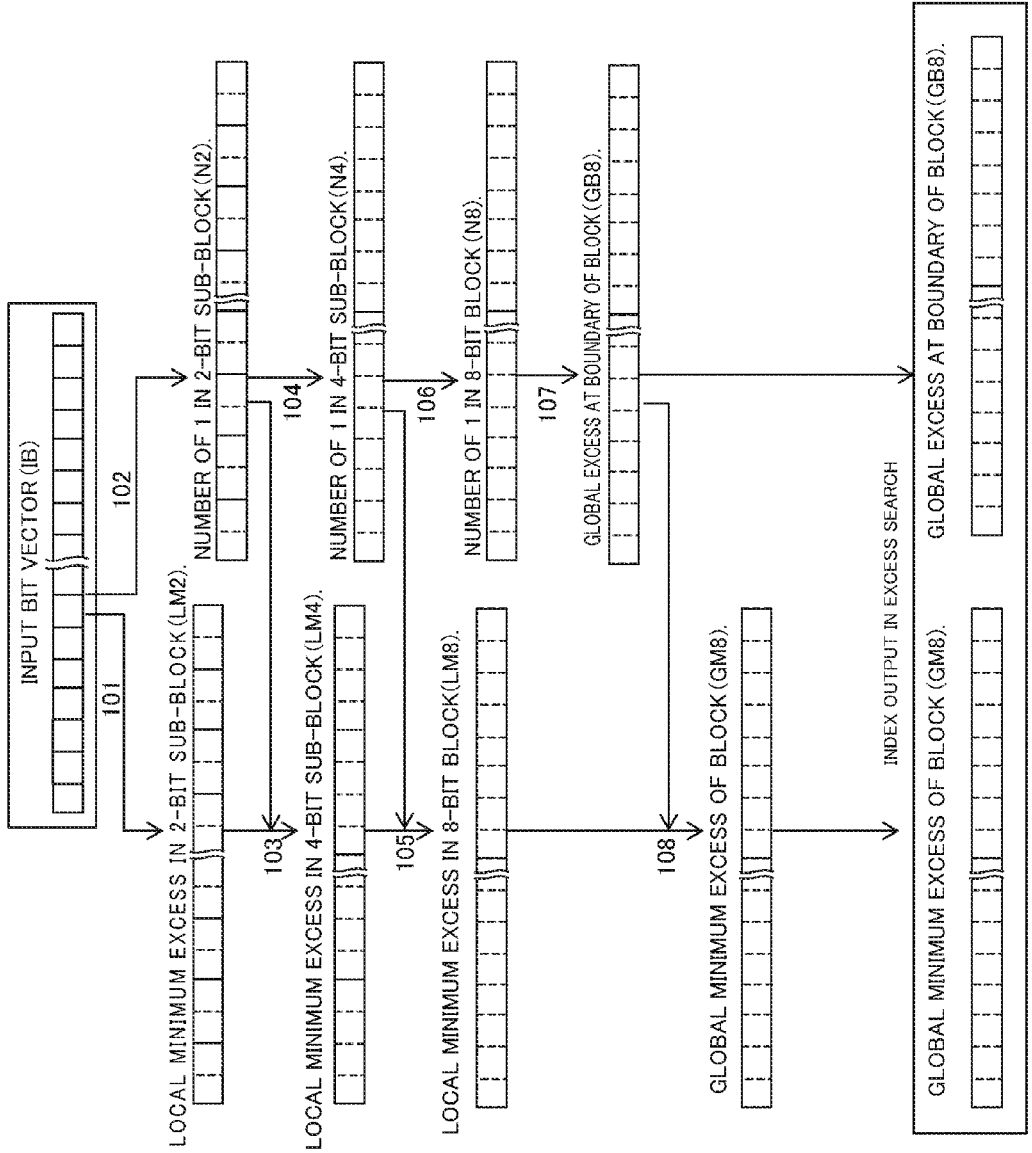
FIG. 8 is a diagram illustrating a relation of data generated in processing by an index generation unit.

FIG. 8 is a diagram illustrating a relation of data generated in the processing by the index generation unit 52. Specifically, the index generation unit 52 obtains, in bulk, a bit vector IB including arrayed blocks of which the number is a predetermined number (eight in the example in FIG. 8) from the storage unit 12, and executes the same operation with respect to the respective blocks included in the bit vector IB so as to thereby calculate collectively the local excess at the boundary, the local minimum excess, and the local maximum excess, and further to calculate collectively the global excess at the boundary, the global minimum excess, and the global maximum excess.

The number of bits included in the bit vector IB is the same as a register length or the number of bits of operation units of the processor 11 (this number will be hereinafter referred to as a "process unit length"). In this embodiment, the number of bits of the bit vector IB is 64, and the bit vector IB is data in which eight 8-bit blocks are arrayed. Blocks are arrayed such that the block numbers thereof become larger sequentially from the low order side (the right side) of the bit vector IB. In a different point of view, this corresponds to store, in the bit vector IB, a bit string including a plurality of blocks and corresponding to the process unit length among the bit string of the parentheses tree data.

Processing by the index generation unit 52 will be further described. In particular, a case will be described below in which the process unit length is 64 and the bit number of each block is 8. The excess-at-boundary calculation unit 54, included in the index generation unit 52, executes processing 102 for generating data N2 from the bit vector IB, processing 104 for generating data N4 from the data N2, and processing 106 for generating data N8 from the data N4.

Each of the data N2, N4, N8 is data of the process unit length (64 bits here) and includes eight blocks. The data N2 includes thirty two (four for each block) 2-bit sub-blocks; the data N4 includes sixteen (two for each block) 4-bit sub-blocks. In a sub-block of each of the data N2, N4, N8, the number of bits with the value "1" (hereinafter a bit "1") in the part of the bit string of the bit vector IB, corresponding to that sub-block is held.

Specifically, in the processing 102, the excess-at-boundary calculation unit 54 stores the value of the number of bits "1" of two adjacent bits in the bit vector IB in a corresponding sub-block of the data N2. The bit positions of the two adjacent bits are the same as the bit positions of the corresponding sub-block. In the processing 104, the excess-at-boundary calculation unit 54 adds the values of the numbers of bits "1" in two adjacent sub-blocks of the data N2, and stores the added value in a corresponding 4-bit sub-block of the data N4. The position of the two sub-blocks in the data N2 is the same as the position of a corresponding 4-bit sub-block in the data N4. In the processing 106, the excess-at-boundary calculation unit 54 adds the values of the numbers of bits "1" in two adjacent 4-bit sub-blocks of the data N4 in a position corresponding to a respective block of the data N8, and stores the added value in the block, which is a block in a position corresponding to the two sub-blocks, among the blocks of the data N8.

In the following, specific processing executed by the index generation unit 52 or the like will be described using an expression. Below, "&", "|", "~", "<<", ">>", "*" indicate a bitwise operation of a logical product, a bitwise operation of a logical sum, a NOT operation, a left shift operation, a right shift operation, and multiplication, respectively. Generally, the processor 11 executes these operations and bitwise operations of addition, subtraction, exclusive or (XOR) in a minimum clock. An overline, if any, of a character in an expression indicates that data of the character is given a NOT operation.

"$-_k$" indicates subtraction for every k-bit sub-block. "$+_k$" indicates addition for every k-bit sub-block. "$\Leftarrow_k$" indicates comparison for every k-bit sub-block and storing of the result, which has a value either 1 or 0 at the lowest-order bit of a sub-block. The processing for executing the operations "$-_k$", "$+_k$", "$\Leftarrow_k$" by a general purpose processor 11 by executing a program is expressed by the expression below.

[Expression 1]

$$x -_k y \equiv ((x | H_k) - (y \& \overline{H_k}) \oplus (((x \oplus \overline{y}) \& H_k))$$

$$x +_k y \equiv ((x \& \overline{H_k}) + (y \& \overline{H_k})) | (((x \oplus y)) \& H_k)$$

$$x \leq_k y \equiv ((((y | H_k) - (x \& \overline{H_k})) \oplus x) \oplus y) \& H_k$$

where "$\oplus$" is bitwise-XOR(exclusive OR) operation

"$H_k$" indicates a bit string whose size is a process unit in which the highest-order bit of each of the k-bit sub-blocks included therein is 1 and the rest is 0. "$L_k$" indicates a bit string whose size is the process unit in which the lowest-order bit of each of the k-bit sub-blocks included therein is 1 and the rest is 0. For example, $H_4$ may be expressed in binary as "10001000 - - - 10001000", and $L_4$ as "00010001 . . . 00010001".

The processing for generating the data N2, N4, N8 provided by the excess-at-boundary calculation unit 54 executing a program is expressed by the expression below.

[Expression 2]

$$x \leftarrow x - ((x >> 1) \& \mu_0) \tag{1}$$

$$x \leftarrow (x \& \mu_1) + ((x >> 2) \& \mu_1) \tag{2}$$

$$x \leftarrow (x + (x >> 4)) \& \mu_2 \tag{3}$$

The expression (1) expresses the processing 102; the expression (2) expresses the processing 104; the expression (3) expresses the processing 106. X on the right side of the arrow in the expression (1) indicates the bit vector IB; x on the left side indicates the data N2. X on the right side of the arrow in the expression (2) indicates the data N2; x on the left side indicates the data N4. X on the right side of the arrow in the expression (3) indicates the data N4; x on the left side indicates the data N8. In principle, the value of x in the expressions (1) to (3) is stored in a register in the processor 11 when calculation is executed. "$\mu_k$" (k being any of 0, 1, and 2) indicates a constant expressed by the expression below. Specifically, "$\mu_k$" is data of the process unit length, being a value in accordance with the parameter k, and considered, in processing, as a constant calculated in advance.

[Expression 3]

$$\mu k := (2^w - 1) \backslash (2^{2^k} + 1)$$

Note that "\" indicates an integer division, and w indicates the number of bits in process units. $\mu_0$ is expressed in binary as "01010101 . . . 01010101", $\mu_1$ as "00110011 . . . 00110011", and $\mu_2$ as "00001111 . . . 00001111".

The local excess at the boundary, which is a local excess at the end of a block or a sub-block, can be calculated from the data N2, N4, N8. Specifically, when the number of bits "1" in a block of the data N8 is doubled and then subtracted by the total number of bits in the block, namely, 8, a local excess at the boundary is obtained. Similarly, when the value of the number of bits "1" in 2 or 4-bit sub-block is doubled and then subtracted by 2 or 4, a local excess at the boundary of the 2 or 4-bit sub-block is obtained. As described above, the number of bits "1" is a value having correspondence with the local excess at the boundary.

The excess-at-boundary calculation unit 54 executes processing 107 for generating data GB8 from the data N8. Specifically, the excess-at-boundary calculation unit 54 adds, to the local excess at the boundary of each block included in the data N8, the global excess at the boundary of an immediately preceding block, to thereby obtain the global excess at the boundary of the block, and stores in a corresponding block in the data GB8.

The minimum excess calculation unit 55, included in the index generation unit 52, executes processing 101 for calculating data LM2 from the bit vector IB, processing 103 for calculating data LM4 from the data LM2 and the data N2, processing 105 for generating data LM8 from the data LM4 and the data N4, and processing 108 for generating data GM8 from the data LM8 and the data GB8.

Each of the data LM2, LM4, LM8, GM8 is data of a process unit length, and includes eight blocks. Specifically, the data LM2 includes thirty two (four for each block) 2-bit sub-blocks, and the data LM4 includes sixteen (two for each block) 4-bit sub-blocks. In a sub-block of the data LM2, LM4, the value of the local minimum excess of the part of the bit string of the bit vector IB, corresponding to the position of the sub-block is stored. In blocks included in the respective data LM8 and GM8, the value of the local minimum excess and the value of the global minimum excess of a block of the bit vector IB, corresponding to the positions of the blocks are respectively stored. The data LM2, LM4, LM8, GM8 are stored in a memory or a register of the process unit length of the storage unit 12.

FIG. 9 is a diagram for explaining one example of a process of calculation of the local minimum excess by the index generation unit 52. FIG. 9 is a diagram illustrating a process in which the minimum excess calculation unit 55 processes the bit string shown in FIG. 6. In FIG. 9, to facilitate explanation, only 16 bits are shown for a bit string, though an actual operation is executed in process units of 64 bits in this embodiment. Although bits of the bit string of the parentheses tree data are arrayed from the lowest-order bit to a higher-order bit of a register or a memory, as described below, the bits of the bit string are arrayed from left to right in FIG. 9. Accordingly, as to the bit strings and the values in FIG. 9, the left side corresponds to a lower-order bit. In the following, FIG. 9 will be described as well as details of the processing shown in FIG. 8.

In the following, processing for calculating data LM2, LM4, LM8, GM8 by the minimum excess calculation unit 55 will be described.

Processing 101 for calculating data LM2 (data Z) from the bit vector IB by the minimum excess calculation unit 55 is expressed by the expression (4) below.

[Expression 4]

$$Z \leftarrow (H_{2-2}(x \& L_2)) \oplus ((x \& L_2) | ((x >> 1) \& L_2))  \quad (4)$$

The expression (4) expresses processing for calculating a local minimum excess of a 2-bit sub-block from the bit string of the parentheses tree data, in which x indicates the bit vector IB. In the example shown in FIG. 9, the calculated data Z corresponds to the local minimum excess shown in the second row.

Processing 103 for calculating data LM4 from the data LM2 by the minimum excess calculation unit 55 and processing 105 for calculating data LM8 from the data LM4 are expressed by the expressions (5) to (8) below.

[Expression 5]

$$L \leftarrow \text{extend}_{2l}((Z \& \mu_j)) \quad (5)$$

$$U \leftarrow \text{extend}_{2l}((Z >> l) \& \mu_j) \quad (6)$$

$$S \leftarrow \text{extend}_{2l}((2*(C_l \& \mu_j) - _l((L_l*l) \& \mu_j)) \quad (7)$$

$$T \leftarrow \min_{2l}(L, S +_{2l} U) \quad (8)$$

In the above, l is a parameter, indicating the number of bits in a sub-block included in data to be processed. The value of l is 2 when calculating data LM4 from data LM2, and 4 when calculating data LM8 from data LM4. Data Z indicates a local excess, and is input from one of the data LM2 and the data LM4 corresponding to the parameter l. "Extend$_{2l}$" indicates an operation of converting the values stored in the low-order bits of which the number is l (hereinafter referred to as l bits) in each 2l-bit sub-block into a 2l-bit value. More specifically, "extend$_{2l}$" is an operation of copying the value in the l$^{th}$ bit counted from the low-order side to high-order l-bits. This operation is an operation for precisely expressing a negative value. "Cl" indicates the values of bits in the process unit that include a plurality of l-bit sub-blocks, indicating data N2 or data N4.

The expression (5) indicates processing by the minimum excess calculation unit 55 for storing the value of a low-order l-bit sub-block of the 2l bits of the data Z, corresponding to 2l bits, in corresponding 2l bits included in data L of the local minimum excess (low-order). This corresponds to the arrow indicating storing of a local minimum excess on a low-order side of two adjacent local minimum excesses shown in the second row in FIG. 9 into the local minimum excess (low-order).

Expression (6) indicates processing by the minimum excess calculation unit 55 for storing the value of a high-order l-bit sub-block of the 2l bits of the data Z, corresponding to 2l bits, in corresponding 2l bits included in data L of the local minimum excess (high-order).

Expression (7) indicates processing for calculating a local excess at a boundary (low-order) S at the end of the low-order (on the head side of the bit string) l bits in a case where the minimum excess calculation unit 55 divides the data Cl, corresponding to 2l bits, for every 2l bits. FIG. 9 shows an example of the local excess at the boundary (low-order) S.

Expression (8) indicates processing by the minimum excess calculation unit 55 for calculating "$S+_{2l}U$", which is data indicating the local minimum excess of the high-order l bits when using the head of the low-order l bits as a reference, and obtaining a value T which is a smaller one of the local minimum excess L of the low-order l bits and "$S+_{2l}U$". Specifically, in the example in FIG. 9, in the processing for calculating "$S+_{2l}U$", 2 in the leftmost sub-block of the local excess at the boundary (low-order) shown in the third row is added to 0 in the second from left sub-block of the local minimum excess shown in the second row, and the resultant value, namely, 2, is stored as a value of the local minimum excess (high-order) in the fifth row. Further, in the example in FIG. 9, with "min", the value of a smaller one of the local minimum excess (high-order) and the local minimum excess (low-order) is stored in a 4-bit sub-block of the local minimum excess in the next row, that is in the sixth row.

Processing "$\min_k$" for obtaining the value of smaller one is provided by the minimum excess calculation unit 55 executing a bitwise operation expressed by the expression below.

[Expression 6]

$$\min_k(x,y) \equiv (x\&\bar{t}) | (y\&t)$$

where $$t = (H_k -_k (x \leq_k y)) \oplus H_k$$

In the processing 108, the minimum excess calculation unit adds the data GB8 calculated by the excess-at-boundary calculation unit 54 and the data LM8, which indicates the local minimum excess of each block, to thereby obtain the data GM8 indicating the global minimum excess.

Although a data flow for obtaining the local maximum excess and the global maximum excess is not shown in FIG. 8, processing for obtaining the local maximum excess and the global maximum excess is provided by the maximum excess calculation unit 56 executing processing resulting from partial modification of the processing for obtaining the minimum excess. In the following, only a difference from the processing for obtaining the minimum excess is described.

The maximum excess calculation unit 56 calculates the local maximum excess of each of a plurality of 2-bit sub-blocks by executing the processing expressed by the expression (9) below. The expression (9) replaces the processing expressed by the expression (4) in calculation by the minimum excess calculation unit 55.

[Expression 7]

$$Z \leftarrow (x-_2 L_2) +_2 ((\sim(x | (x>>1))) \& L_2) \qquad (9)$$

The maximum excess calculation unit 56 executes the processing expressed by the expressions (5) to (7) (though the local maximum excess is stored in L or U here), and executes, instead of the expression (8), processing for obtaining larger one of the local maximum excess L of the low-order l bits and "$S+_{2l}U$", which indicates the local maximum excess of the high-order l bits when using the head bit of the low-order l bits as a reference. Processing "$\max_k$" for obtaining the value of a larger one is provided by the maximum excess calculation unit 56 executing the bitwise operation expressed by the expression below.

[Expression 8]

$$\max_k(x,y) \equiv (x\&t) | (y\&\bar{t})$$

The maximum excess calculation unit 56 adds the data of the local maximum excess calculated for every block and the data GB8 of the global excess at the boundary, to thereby obtain data of the global maximum excess.

The processing for obtaining the local maximum excess or the local minimum excess is provided by the processor 11 executing a program using a bitwise operation, addition, multiplication, or the like, but not using conditional branch. With the above, speed reduction attributed to pipeline control by the processor 11 due to conditional branch can be prevented, and parallel execution of the processing can be readily achieved. Further, as it is not necessary to provide a look-up table having 256 (8th power of 2) keys, different from the technique described in Non-Patent Literature 2, the required amount of memory can be reduced.

Note here that a part or all of the above described processing for obtaining the local minimum excess, the local maximum excess, or the like may be provided by a hardware. For example, of the operations expressed by the above mentioned expressions, operations of "$+_k$" and "$-_k$" with a large throughput may be executed by the processor 11 by inputting data into a dedicated operation unit connected to the bus 15, and obtaining a result of an operation via the bus 15.

Figure 10:
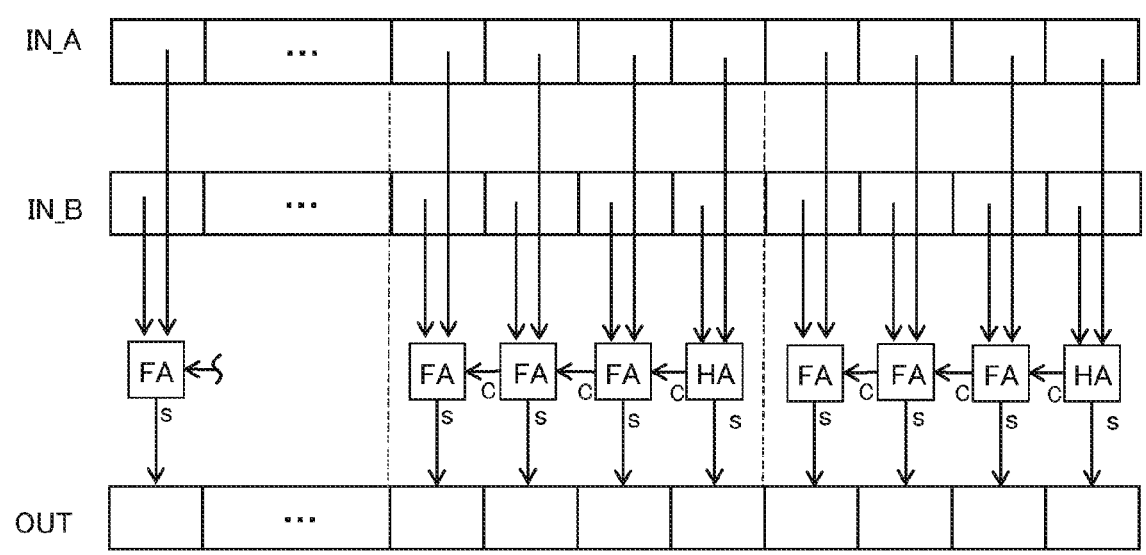
FIG. 10 is a circuit diagram illustrating one example of an addition unit for adding a plurality of bit groups.

FIG. 10 is a circuit diagram illustrating one example of an addition unit for adding a plurality of bit groups. The addition unit shown in FIG. 10 is an operation unit for calculation "$+_4$". This addition unit adds values of input IN_A and IN_B for every 4-bit sub-block. The addition unit includes a half adder HA provided with respect to the lowest-order bit number in a sub-block and a full adder FA provided with respect to a bit number other than the lowest-order bit number in the sub-block. The half adder HA adds bits corresponding to the respective inputs IN_A and IN_B, and outputs a result S to a bit corresponding to the output OUT, and further outputs a carry C to a full adder FA of a higher-order by one. The full adder FA adds a carry C of the previous one and bits corresponding to the respective inputs IN_A and IN_B, and outputs a result S to a bit corresponding to the output OUT, and further outputs a carry C to a full adder FA of a higher-order by one, if any. With a hardware, a simple arrangement for preventing output of a carry C beyond a boundary of a sub-block can implement calculation "$+_4$". Moreover, it is possible to implement, using a hardware, other operations such as "$-_k$" or the like, with a similar arrangement for preventing output of a carry C beyond a boundary of a sub-block and with providing an operation circuit for generating a bit indicating whether an operation result is 0 or negative. Note that an operation unit may have a function for executing a program. In this case, the operation unit, instead of the processor 11, may execute other operations, such as expressions (5) to (8).

Note here that although the number of bits of a block is 8 in the above description, it may be other values, such as sixteen. However, preferably, the number of bits of a block is a power of two. When the number of bits is increased, the number of times at which the processing expressed by the expressions (5) to (8) is repeated may be accordingly increased.

The index generation unit 52 may store the local excess at the boundary, the local minimum excess, and the local maximum excess in the storage unit 12, without calculating the global excess at the boundary, the global minimum excess, and the global maximum excess. The block specification unit 63, to be described later, may obtain the global excess at the boundary, the global minimum excess, and the global maximum excess from the local excess at the boundary, the local minimum excess, and the local maximum excess when executing processing for specifying a block. The index generation unit 52 may not calculate the local maximum excess or the global maximum excess as an index. Non-Patent Literature 2 discloses a method for searching without using the local maximum excess.

The data transmission unit 53 is mainly provided by the processor 11, the storage unit 12, and the communication unit 13. The data transmission unit 53 sends the semi-structure text data, the parentheses tree data, the bit position relation data, and the global excess at the boundary, the global minimum excess, and the global maximum excess of each of a plurality of blocks included in the parentheses tree data to the data receiving unit 61 (step S95). Alternatively, the data transmission unit 53 may send the local excess at the boundary, the local minimum excess, and the local maximum excess.

The data receiving unit 61 is mainly provided by the processor 11, the storage unit 12, and the communication unit 13. The data receiving unit 61 receives the information sent from the data transmission unit 53, and stores in the storage unit 12 (step S96).

The query obtaining unit 62 is mainly provided by the processor 11, the storage unit 12, and the input/output unit 14. Based on a search condition (a condition for searching for data included in the semi-structure text data) obtained from an API with an application program executed in the client device 2 or the like, the query obtaining unit 62 obtains a bit position in the bit string of the parentheses tree data at which to start searching, and a global excess as a condition on a bit position to be searched for (step S97). For example, the query obtaining unit 62 obtains from an API, an instruction for finding a bit position of a closing parenthesis corresponding to an opening parenthesis at a bit position i or an instruction for finding a bit position of an opening parenthesis corresponding to a closing parenthesis at a bit potion i, and obtains, through an operation, the global excess of a bit position searched for in response to such an instruction. A method for obtaining the global excess is not described in detail here as being known. Note that the query obtaining unit 62 may obtain a local excess with any bit position used as a reference, instead of a global excess, as a search condition.

The block specification unit 63 is mainly provided by the processor 11 and the storage unit 12. The block specification unit 63 specifies a block including a bit with the excess given as the search condition, based on the local excesses at the boundaries and the local minimum excesses of the respective blocks included in the parentheses tree data (step S98). In this embodiment, the block specification unit 63 specifies a block including a bit with the excess given as the search condition, based on the global excesses at the boundaries, the global minimum excesses, and the global maximum excesses.

Figure 11:
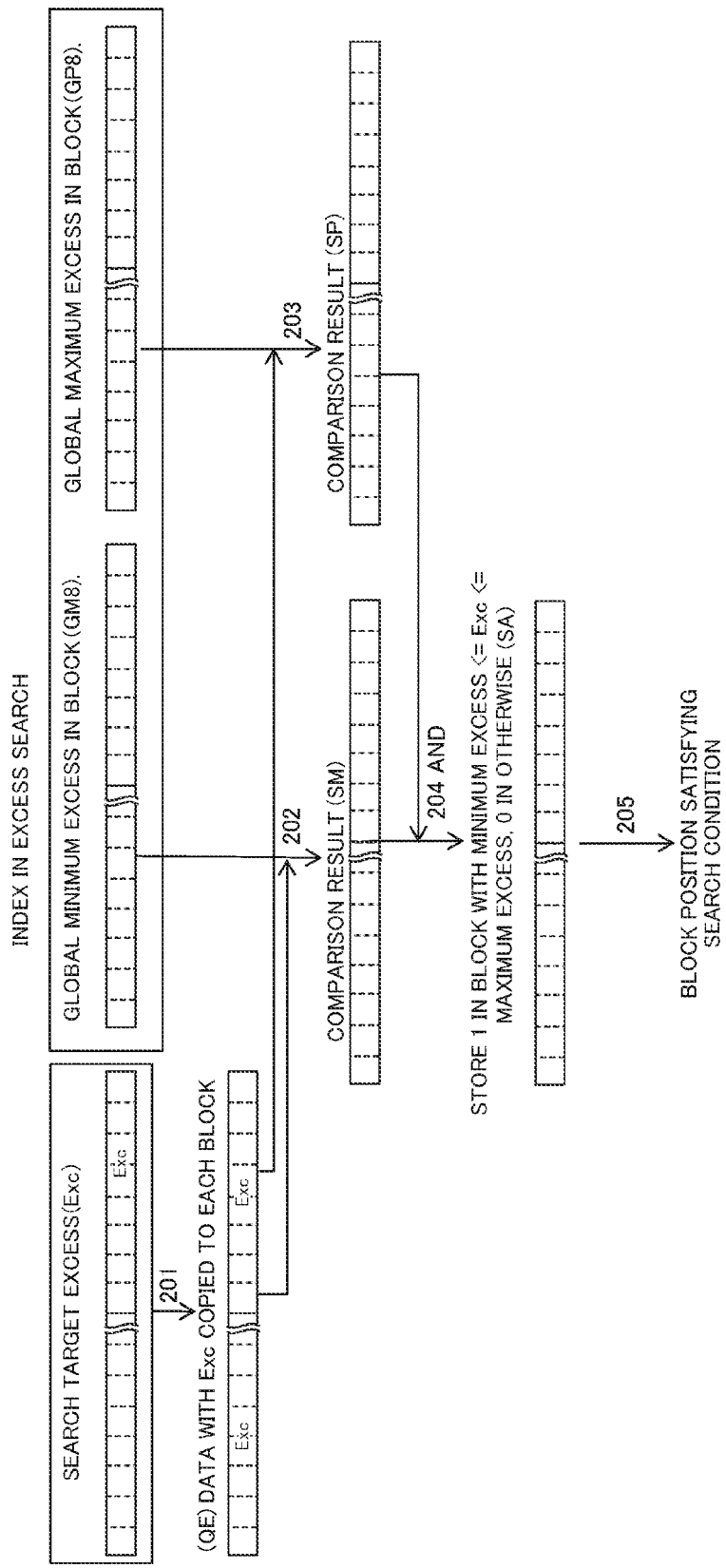
FIG. 11 is a diagram illustrating a relation of data generated in processing by a block specification unit.

FIG. 11 is a diagram illustrating a relation of data generated in the processing by the block specification unit 63.

The block specification unit 63 executes processing 201 for generating search condition data QE from a 8-bit global excess Exc (a search target excess) given as a search condition, processing 202 for outputting data SM indicating whether or not each block included in the data GM8 of the global minimum excess is equal to or less than the global excess Exc indicated by the search condition data QE, processing 203 for outputting data SP indicating whether or not each block included in the data GP8 of the global maximum excess is greater than the global excess Exc indicated by the search condition data QE, and processing 204 for executing an AND operation with the data SM and the data SP to output data SA indicating the operation result.

Each of the data SM, SP, SA is data which has a process unit length, and includes eight blocks in this embodiment. In each block of the data SM, 1 indicating true is stored in a case where a corresponding block of the data GM8 is equal to or less than the global excess Exc, and 0 indicating false is stored in a case where a corresponding block of the data GM8 is greater than the global excess Exc. In each block of the data SP, 1 indicating true is stored in a case where a corresponding block of the data GP8 is equal to or greater than the global excess Exc, and 0 indicating false is stored in a case where a corresponding block of the data GP8 is less than the global excess Exc. Therefore, in each block of the data SA, 1 indicating true is stored in a case where the global excess Exc is equal to or greater than the value of a corresponding block of the data GM8 and equal to or less than a corresponding block of the data GP8.

Specifically, the processing 201 is provided by processing of multiplying $L_8$ by the global excess Exc. The processing 202, 203 is provided by an operation "$\Leftarrow_k$" or the like. The processing 201 to 203 is provided by the processor 11 by executing a program using a bitwise operation, addition, multiplication or the like, but not using conditional branch.

In the processing 205, the block specification unit 63 specifies the earliest block with the value of true (the block on the right side in FIG. 11) as a block including a bit satisfying the search condition.

Note that, as described above, in obtaining the bit position of a closing parenthesis corresponding to an opening parenthesis, the global maximum excess or the local maximum excess may not be used. In this case, a block may be specified without executing the processing 203, 204. This method is described in Non-Patent Literature 2.

The bit position specification unit 64 is mainly provided by the processor 11 and the storage unit 12. The bit position specification unit 64 specifies, in the block specified by the block specification unit 63, the position of a bit with an excess as the search condition (step S99).

Figure 12:
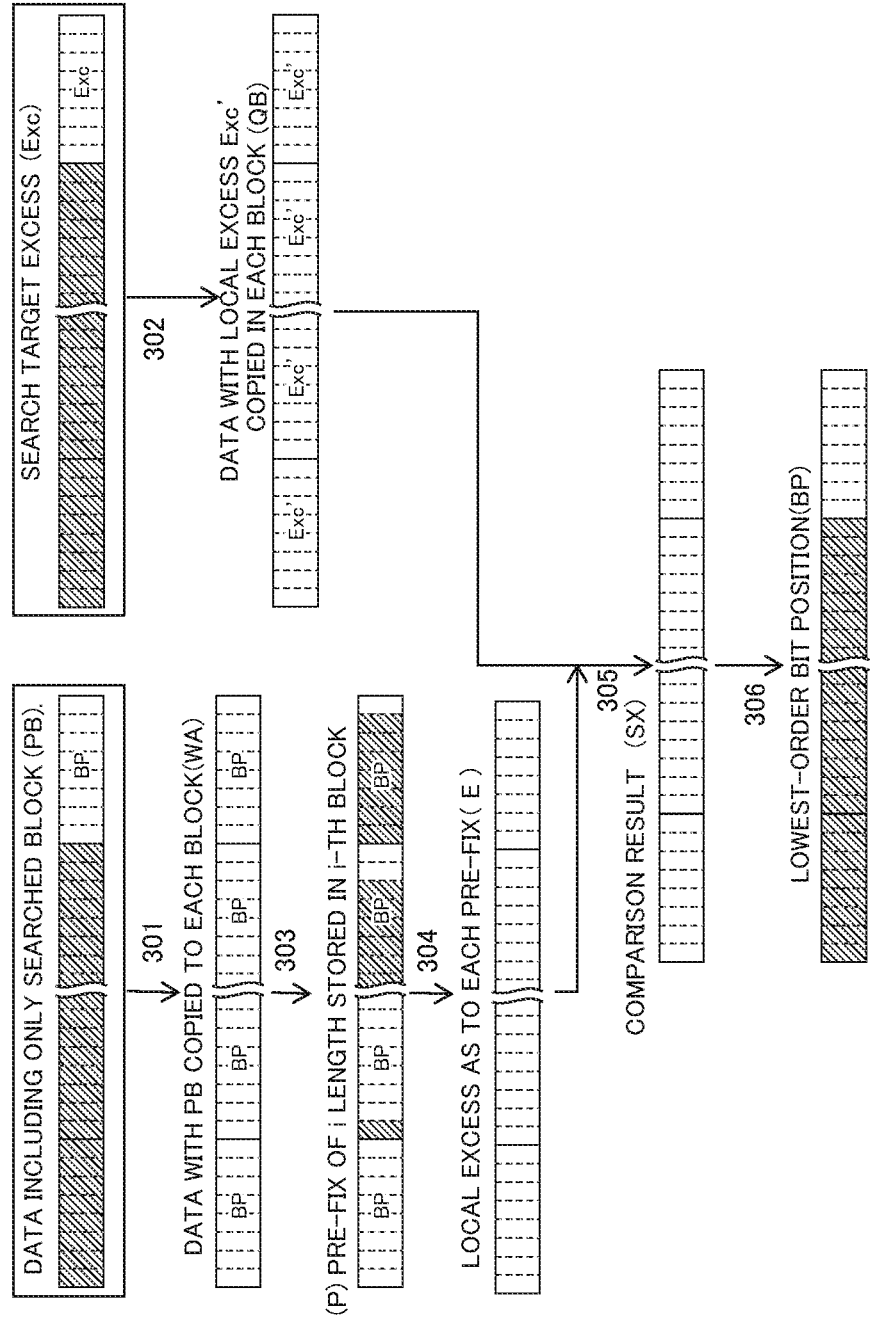
FIG. 12 is a diagram illustrating a relation of data generated in processing by a bit position specification unit.

FIG. 12 is a diagram illustrating a relation of data generated in the processing by the bit position specification unit 64. The bit position specification unit 64 obtains a bit string PB of the block specified and the global excess Exc that is the search condition. Then, the bit position specification unit 64 executes processing 301 for generating data WA which has a process unit length and in which each block includes the bit string PB, and processing 302 for obtaining a local excess Exc', in case that a local excess of the head of the block is 0, based on the global excess as the search condition, to generate data QB in which the local excess Exc' is stored in each block. The bit position specification unit 64 further executes processing 303 for generating data P from the data WA, processing 304 for generating data E from the data P, processing 305 for generating data SX from the data E and the data QB, and processing 306 for specifying a bit position that satisfies the search condition, based on the data SX.

Each of the data WA, P, E, QB, SX is a data which has a process unit length, and includes eight blocks.

Specifically, in the processing 301, the bit position specification unit 64 multiplies $L_k$ (k being a block length) and the bit string PB to thereby obtain the data WA. In the processing 302, the bit position specification unit 64 subtracts the global excess at the boundary of a block preceding the specified block from the global excess Exc as the search condition to thereby obtain the local excess Exc' that makes a search condition, and then multiplies the local excess Exc' by $L_k$ to thereby obtain the data QB.

Figure 13:
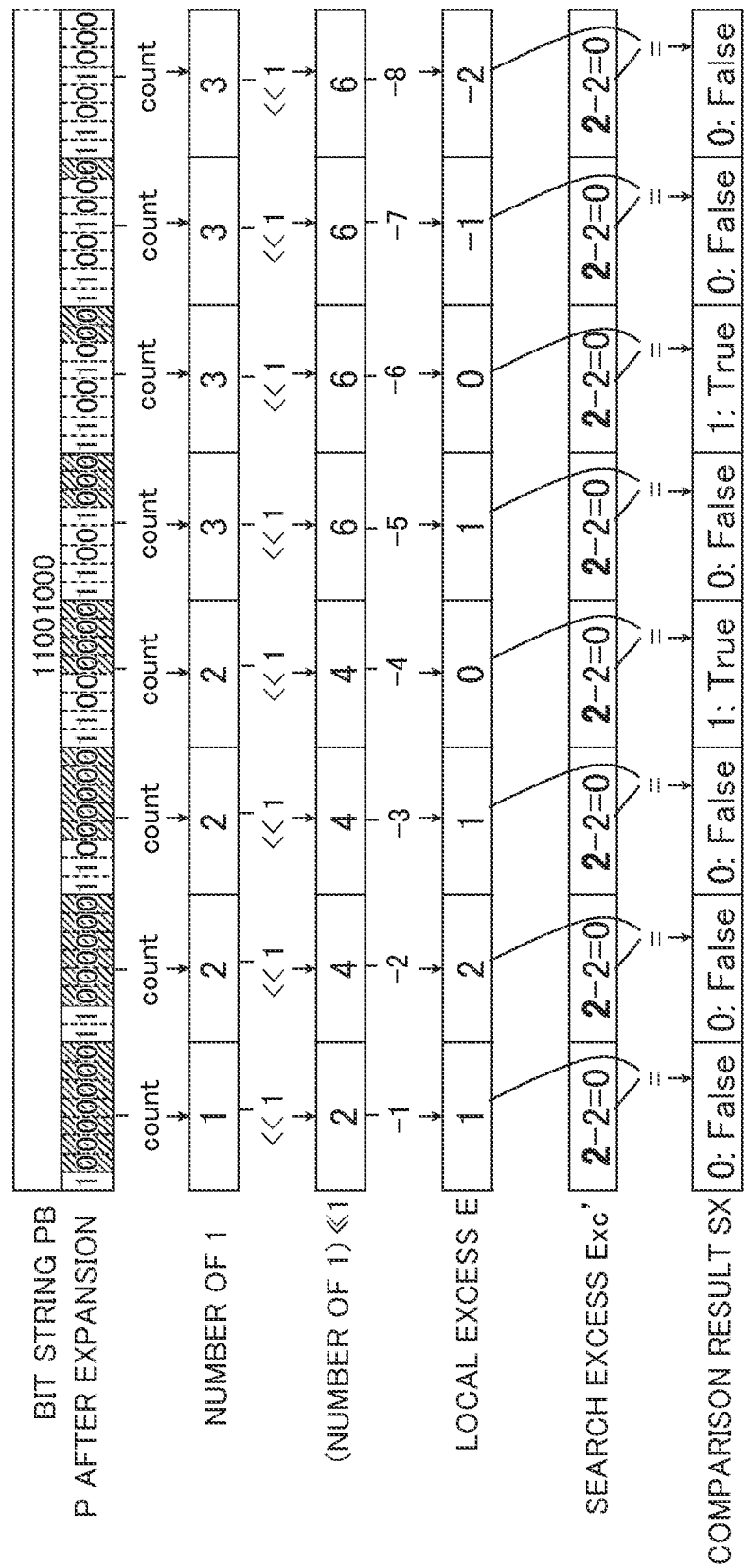
FIG. 13 is a diagram for explaining one example of a process of a search for a bit position by a bit position specification unit.

FIG. 13 is a diagram for explaining one example of a process in a search for a bit position by the bit position specification unit 64. Specifically, FIG. 13 shows a process of processing executed in a case where the block specification unit 63 specifies the block numbered 1 of the bit string shown in FIG. 6 when the global excess that makes the search condition is 2. Note that as to the bit strings and the values in FIG. 13, the left side corresponds to a low-order bit. In the following, the example shown in FIG. 13 will be described, as well as details of the processing shown in FIG. 12.

In the processing 303, the bit position specification unit 64 generates the data P in which each block has leading bits of the block of the data WA and the number of the leading bits is the no-mask number, based on the data WA. The no-mask number is a value between 1 and the block length, and the value is different depending on the position of the block. For example, the no-mask number takes a value from 1 to 8 as the block in the data goes from right to left.

Each block included in the data P is such that the values of the leading bits, of which number is the no-mask number, are left as original, and the values of the other bits are changed to a predetermined value (0). The processing 301 and 303 is expressed by the expression (10) below.

[Expression 9]

$$P \leftarrow (L_k * x) \& U \quad (10)$$

X indicates the bit string of the specified block; U indicates a value in which the leading bits, of which the number is the no-mask number, are 1 in each block, and those of the other bits are 0 and U has the process unit length. U in this embodiment is expressed in binary as "11111111 01111111 00111111 00011111 00001111 00000111 00000011 00000001". In the example shown in FIG. 13, the data shown in the row after expansion is this data P. Note that, in FIG. 13, as the left side of the bit string corresponds to a low-order, the shown data is left-right opposite from the binary representation of U. In the processing 301 and 303, the processor 11 stores the value of the specified block in a register, then multiplies the register by L8, and executes an AND operation with the multiplied register and U.

In the processing 304, the bit position specification unit 64 calculates the data E in which the local excess of an end bit among the no-mask number of bits obtained as to each block included in the data P is stored. The processing 304 is expressed by the expression below.

[Expression 10]

$$E \leftarrow (2 * \text{count}_k(P)) -_k B \quad (11)$$

In the above, B indicates data which has a process unit length, and includes eight blocks, in each of which the no-mask number of a corresponding block of the data U is stored.

In the processing 304, initially, the bit position specification unit 64 stores a bit string indicating the number of bits "1" in each block of the data U, to a corresponding block of the data WB of a unit processing length. The data WB is obtained by the bit position specification unit 64 executing the operations expressed by the expressions (1) to (3). More specifically, supposing that the data P is stored in the first register R1, the processor 11 copies the value of R1 to a second resister R2, then shifts R1 to the right by one bit, executes an AND operation with R1 and $\mu_0$, subtracts R1 from R2, copies the value of R2, which is a result of subtraction, to R1, shifts R2 to the right by two bits, executes an AND operation with R1 and $\mu_1$, adds R1 and R2, copies the value of R1, which is a result of addition, to R2, shifts R1 to the right by four bits, adds R1 and R2, and executes an AND operation with the value of R1, which is a result of addition, and $\mu_2$, to have the result as the data WB.

Thereafter, in the processing 304, the bit position specification unit 64 shifts the data WB to the left by one bit to thereby double the number of bits "1" (see the arrow extending from the row of "number of 1" to the row immediately therebelow in FIG. 13), and then, as to each block of the shifted data WB, subtracts a no-mask number in accordance with the block to thereby obtain the data E, which is a bit string indicating the local excess (see the arrow directed to "local excess" in FIG. 13). More specifically, the processor 11 shifts R1 where the data WB is stored to the left by one bit, executes an OR operation with H8 and R1, subtracts U from R1, and executes an XOR operation with R1, which is a subtraction result, and H8, to thereby obtain the data E.

Thereafter, in the processing 305, the bit position specification unit 64 generates the data SX in which, for each block included in the data E, 1 indicating true is stored in a case where the local excess of the end bit in each block is the same as the search local excess Exc', or 0 indicating false is stored in a case where the above mentioned local excess is different from the search local excess Exc' (see the arrow directed to "comparison result" in FIG. 13). In the processing 306, the bit position specification unit 64 generates from the data SX, the data BP in which the position of a bit satisfying the search condition in a block is stored. The processing 305 and 306 is expressed by the respective expressions (12) and (13) below.

[Expression 11]

$$T \leftarrow E =_k (L_k * d) \quad (12)$$

$$Z \leftarrow (LSB(T) >> j) + 1 \quad (13)$$

"$L_k * d$" in the expression (12) indicates the data QB, and "T" indicates the data SX. Comparison between the data QB and the data E may be executed in response to SIMD instruction implemented in the processor 11 for collective comparison of a plurality of blocks (for example, a plurality of bytes) in data, or by the processor 11 by executing an XOR operation with the data QB and the data E and then applying a combination of NOT operation, addition, AND operation, and shift operation to the result. Through the processing expressed by the expression (12), the bit position specification unit 64 determines whether or not the excess in a bit position corresponding to the no-mask number in a block is the same as the excess given as the search condition.

In other word, the bit position specification unit 64 determines whether or not a bit position corresponding to the no-mask number is a bit position with the excess that is the search condition. LSB (T) in the expression (13) indicates, in a case where one or more bits of the data SX is/are "1", calculation of the bit position of a bit, among such bits "1", that is positioned rightmost. LSB (T) may be calculated in response to an instruction implemented in the processor 11 or using other known high-speed algorithm. ">>j" in the expression (13) indicates division of the bit position by the block length (8). With the above, the data BP in which the position of a bit, among the bits satisfying the search condition, that is positioned closest to the head of the bit string of each block is stored is obtained.

Further, the bit position specification unit 64 adds "block length x block number" (1×8 in the example in FIG. 13) to the value (4 in the example in FIG. 13) of the data BP to thereby obtain the bit position (12 in the example in FIG. 13) counted from the start position of the bit string of the parentheses tree data, and outputs as a bit position satisfying the search condition.

The processing by the bit position specification unit 64 is provided by the processor 11 executing a program using a combination of a bitwise operation, addition, multiplication or the like, and almost not using conditional branch. With the above, speed reduction attributed to pipeline control by the processor 11 due to conditional branch can be prevented, and parallel execution of the processing can be readily achieved. Further, as it is not necessary to use the look-up table described in Non-Patent Literature 2, the required amount of memory can be reduced. As the look-up table in Non-Patent Literature 2 uses, as a key, a combination of 256, or the kinds of values of the blocks, and 17, or the kinds of local excesses that make a search condition, 256×17 bytes can be conserved as a look-up table.

The query result output unit 65 is mainly provided by the processor 11 and the storage unit 12. Based on the bit position specified by the bit position specification unit 64, the query result output unit 65 outputs data of a character string corresponding to that bit position, included in the semi-structure text data. For example, in a case where the bit position specification unit 64 finds the bit position of a closing parenthesis corresponding to an opening parenthesis as the boundary of a node, as there is a sibling node at the next bit position, the query result output unit 65 obtains a character string corresponding to that bit position, using the bit position relation data, and outputs to a display output device or the like. This corresponds to display of information on the next section or next title in the example shown in FIGS. 4 and 6.

Note that the query obtaining unit 62, the block specification unit 63, the bit position specification unit 64, and the query result output unit 65 may be used as a database engine. In this case, the query obtaining unit 62, the block specification unit 63, the bit position specification unit 64, and the query result output unit 65 may be included in the information processing server, and may conduct a search, using data outputted by the index generation unit 52 or the parentheses tree data generation unit 51 to the storage unit 12. This database engine is effective in a case where, for example, a character string of some node and its descendant node in the semi-structure text data is needed as a result of query.

The invention claimed is:

1. A system for processing information more efficiently, comprising:
   at least one processor; and
   at least one memory device that stores a plurality of instructions, which when executed by the at least one processor, causes the at least one processor to:
   divide a bit string indicating a search target parentheses string into a plurality of blocks;
   calculate a local excess value of an end bit in each block;
   calculate a local minimum excess value that is a minimum local excess value among local excess values of respective bits in each block;
   specify a block including a bit with a given excess value, based on the local excess values of the end bits in the respective blocks and the local minimum excess values of the respective blocks; and
   store a bit string of the specified block in a register;
   generate data WA which includes a plurality of first blocks in which each of the plurality of the first blocks includes the bit string of the specified block;
   generate data QB which includes a plurality of second blocks in which a given excess value l is stored in each of the plurality of second blocks;
   generate data P which includes a plurality of third blocks in which each of the plurality of third blocks includes leading bits of one of the first blocks and a number of the bits is a number m which depends on a position of corresponding one of the third blocks in the data P;
   generate data WB which includes a plurality of fourth blocks each of which includes a number of bits n with a value of 1 in corresponding one of the plurality of third blocks;
   calculate, based on the data WB, data E which includes a plurality of fifth blocks in which a local excess of an end bit among the leading bits of each of the plurality of third blocks is stored in corresponding one of the plurality of fifth blocks;
   generate, based on the data E and the data QB, data SX which indicates whether the local excess in each of the plurality of fifth blocks is the same as the given excess value l;
   generate, based on the data SX, the position of a bit in the bit string of the specified block corresponding to the given excess value l.

2. The system according to claim 1,
   each of the plurality of third blocks includes a tentative bit string in which values of leading bits which are included in the bit string included in the specified block and of which number is the number m are left as original and a value of a remaining bit is changed to a predetermined value;
   when executed by the at least one processor, the plurality of instructions cause the at least one processor to operate, in the calculating data E, to
   shift to left a bit string included in the data WB;
   obtain the data E indicating excess value of the leading bits by subtracting the bit string indicating the position of corresponding one of the third blocks in the data P from the bit string shifted to left.

3. The system according to claim 1, wherein when executed by the at least one processor, the plurality of instructions cause the at least one processor to operate, in the local minimum excess value calculation, to:
   calculate a local minimum excess value and a local excess value at an end with respect to a first sub-block included in each block, and for calculating a local minimum excess value with respect to a second block adjacent to the end of the first sub-block, and
   obtain a smaller one of a value indicating the local minimum excess value calculated with respect to the first sub-block and a value obtained by adding a value indicating the local minimum excess value calculated with respect to the second sub-block to the local excess value at the end calculated with respect to the first sub-block, as a local minimum excess value of a connected bit string obtained by connecting bit strings included in the first sub-block and the second sub-block, respectively.

4. A system for processing information more efficiently, comprising:
   at least one processor; and
   at least one memory device that stores a plurality of instructions, which when executed by the at least one processor, causes the at least one processor to operate to:
   store a bit string of an acquired block in a register;
   generate data WA which includes a plurality of first blocks in which each of the plurality of the first blocks includes the bit string of the acquired block;
   generate data QB which includes a plurality of second blocks in which a given excess value l is stored in each of the plurality of second blocks;
   generate data P which includes a plurality of third blocks in which each of the plurality of third blocks includes leading bits of one of the first blocks and a number of the bits is a number m which depends on a position of corresponding one of the third blocks in the data P;
   generate data WB which includes a plurality of fourth blocks each of which includes a number of bits n with a value of 1 in corresponding one of the plurality of third blocks;
   calculate, based on the data WB, data E which includes a plurality of fifth blocks in which a local excess of an end bit among the leading bits of each of the plurality of third blocks is stored in corresponding one of the plurality of fifth blocks;
   generate, based on the data E and the data QB, data SX which indicates whether the local excess in each of the plurality of fifth blocks is the same as the given excess value l;
   generate, based on the data SX, the position of a bit in the bit string of the acquired block corresponding to the given excess value l.

5. A method for more efficiently processing information, comprising:
   dividing, with at least one processor operating with a memory device in a search server, a bit string indicating a search target parentheses string into a plurality of blocks;
   calculating, with at least one processor operating with a memory device in a server, a local excess value of an end bit in each block;
   calculating, with the at least one processor operating with the memory device in the server, a local minimum excess value that is a minimum local excess value among local excess values of respective bits in each block;
   specifying, with the at least one processor operating with the memory device in the server, a block including a bit with a given excess value, based on the local excess values of the end bits in the respective blocks and the local minimum excess values of the respective blocks; and
   storing a bit string of the specified block in a register;
   generating, with the at least one processor operating with the memory device in the server, data WA which includes a plurality of first blocks in which each of the plurality of the first blocks includes the bit string of the specified block;
   generating data QB which includes a plurality of second blocks in which a given excess value l is stored in each of the plurality of second blocks;
   generating, with the at least one processor operating with the memory device in the server, data P which includes a plurality of third blocks in which each of the plurality of third blocks includes leading bits of one of the first blocks and a number of the bits is a number m which depends on a position of corresponding one of the third blocks in the data P,
   generating data WB which includes a plurality of fourth blocks each of which includes a number of bits n with a value of 1 in corresponding one of the plurality of third blocks;
   calculating, with at least one processor operating with a memory device in a search server, data E which includes a plurality of fifth blocks in which a local excess of an end bit among the leading bits of each of the plurality of third blocks is stored in corresponding one of the plurality of fifth blocks based on the data WB;
   generating, with the at least one processor operating with the memory device in the server, data SX which indicates whether the local excess in each of the plurality of fifth blocks is the same as the given excess value l based on the data E and the data QB; and
   generating with the at least one processor operating with the memory device in the server, the position of a bit in the bit string of the specified block corresponding to the given excess value l based on the data SX.

* * * * *